Aug. 15, 1967  H. D. THOMPSON  3,335,818
SHOPPING CART
Filed Sept. 16, 1965  2 Sheets-Sheet 1

INVENTOR
HAROLD D. THOMPSON
BY Ralph N. Kalish
ATTORNEY

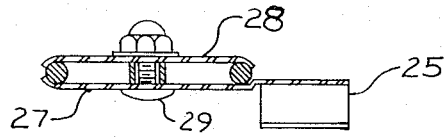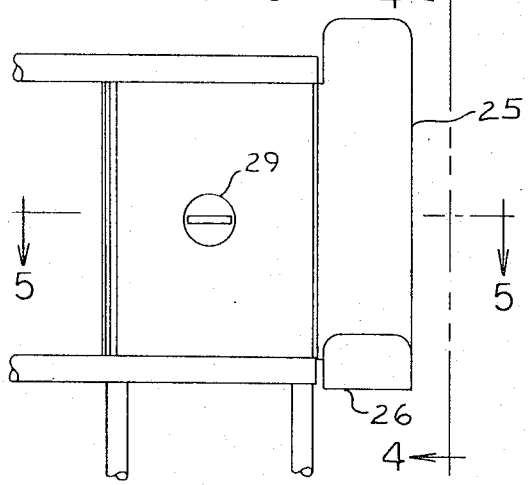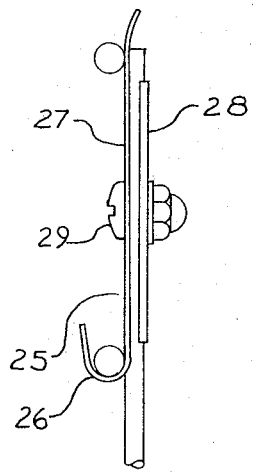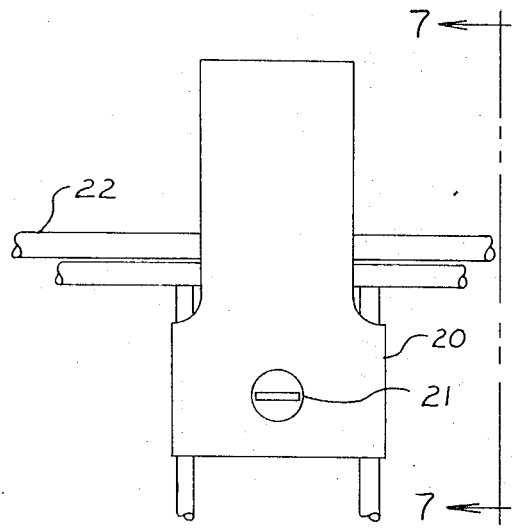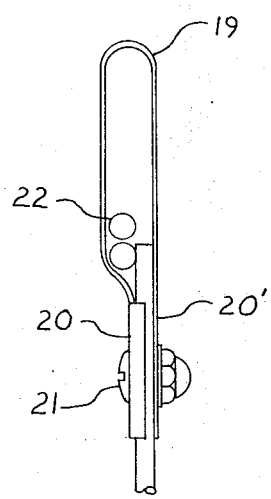

United States Patent Office 3,335,818
Patented Aug. 15, 1967

---

3,335,818
SHOPPING CART
Harold D. Thompson, Jackson, Tenn., assignor to Piggly Wiggly Corporation, Jacksonville, Fla., a corporation of Delaware
Filed Sept. 16, 1965, Ser. No. 487,688
1 Claim. (Cl. 186—1)

This invention relates generally to shopping carts of the type commonly used by customers in self-service grocery and department stores, and, more particularly, to a shopping cart having a side gate for facilitating access to cart contents.

It is the common practice of self-service grocery and department stores to provide their customers with shopping carts for collecting and transporting desired merchandise from the shelves and counters of a store to the check-out stand. After the customer has satisfied his shopping needs, he maneuvers the cart to the check-out stand where the collected merchandise is customarily removed therefrom by hand by the attendant for tabulation purposes. Heretofore, the unloading operation has necessitated lifting the merchandise upwardly of, and over, the side wall of the cart basket and then lowering same onto the check-out stand. In connection with such unloading, the attendant oftentimes must strenuously reach over an intervening counter so that the manual unloading is a most fatiguing procedure requiring frequent rest periods for the attendant with the consequent cost for the services of alternating personnel.

Therefore, it is an object of the present invention to provide an arrangement including a shopping cart with a side gate for substantially eliminating the laborious tiring exertion by an attendant for unloading a shopping cart.

It is another object of the present invention to provide a shopping cart having at least one swingable side gate for permitting ready access to the cart basket contents so as to obviate the need for lifting of the said contents for removal from the said basket.

It is another object of the present invention to provide a shopping cart having at least one swingable side gate adapted for use in conjunction with a counter of predetermined height so that upon opening of said gate the same may be supported upon said counter to conduce to ease of displacement of the cart contents for tabulation and bagging purposes.

It is another object of the present invention to provide a shopping cart of the character stated having at least one side gate which is reliable in closed condition so as to prevent any inadvertent accidental opening during the cart loading procedure.

It is an additional object of the present invention to provide a side gate member for shopping carts which is of simple construction, being fabricated of durable parts and, hence, resistant to break-down; which is completely reliable in usage; the operation of which is most elementary, being readily achieved by the average shopper; which may be incorporated in existing cart constructions without costly modification thereof; and the use of which produces a marked economy in store overhead by allowing personnel to work for extended periods without incurring premature fatigue.

Other objects and details of the present invention will be apparent from the following description when read in connection with the accompanying drawings (two sheets), wherein:

FIGURE 3 is an enlarged fragmentary front view of the keeper.

FIGURE 4 is a vertical end view taken on the line 4—4 of FIGURE 3.

FIGURE 5 is a horizontal transverse sectional view taken on the line 5—5 of FIGURE 3.

FIGURE 6 is a fragmentary front elevational view of the hinge.

FIGURE 7 is a vertical end view taken on the line 7—7 of FIGURE 6.

Figure 1:
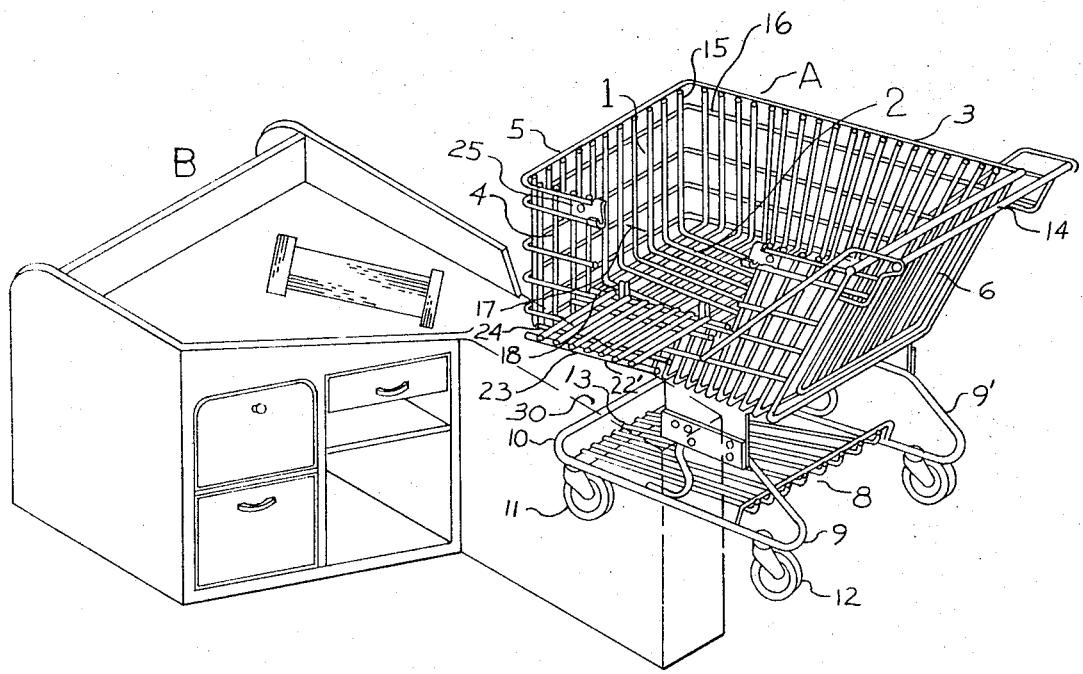
FIGURE 1 is a perspective view of a shopping cart constructed in accordance with and embodying the present invention, illustrating same in unloaded position.
Figure 2:
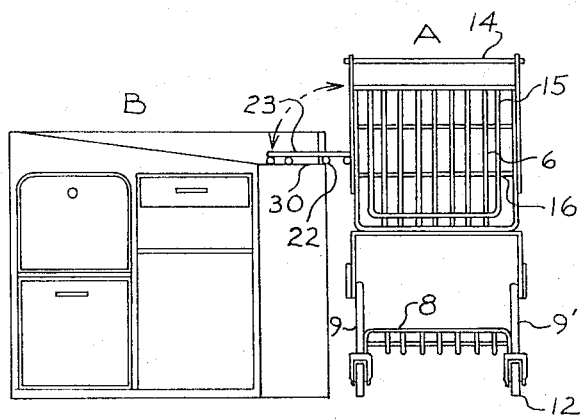
FIGURE 2 is an end elevational view of the cart in unloaded position.

Referring now by reference characters to the drawings which illustrate the preferred embodiment of the present invention, A generally designates a shopping cart of the type supplied by self-service stores to customers for collection of selected merchandise and transporting same to a check-out counter designated, broadly, B for removal of the cart contents, by a store attendant most customarily, for tabulation and bagging purposes.

Cart A may be of any specific construction, such as of the familiar heavy wire or rod construction generally used; incorporating an upper, open-topped basket or receptacle 1, having a substantially horizontal bottom wall 2, side walls 3, 4, forward and rearward end walls 5, 6 respectively. Basket 1 is of suitable height for retainingly receiving a substantial quantity of discrete articles of merchandise selected by the cart user. Carts of the type herein concerned may be forwardly tapered so that forward wall 5 is of less height and width than rearward wall 6, and with the bottom wall 2 being slightly forwardly and upwardly inclined with respect to the horizontal. Such taper, although not a part of the present invention, is dictated solely for nesting purposes to allow compactness in storage when the carts are not in use.

Cart A embodies a carriage portion indicated at 8 having side assemblies 9, 9' for supporting at their upper ends basket 1 and at their lower ends being integrated with a frame 10 for supporting front and rear rollers or casters 11, 12; said frame 10 carrying a horizontal article-support member indicated 13 for receiving the larger, more bulky, articles of merchandise. Said cart A may also be provided with the customary transverse handle or push rod 14.

To facilitate ready comprehension of the present invention the vertically and horizontally constituent wires or rods of the upstanding side and end walls of basket 1 of cart A are respectively referred to by the numerals 15, 16. At least one of said side walls 3, 4 is provided with an opening 17 which is presented preferably in the central upper portion of the related side wall 3, 4, as the case may be, opening through the upper end of such side wall and having its vertical sides defined by spaced-apart rods 15 and its lower edge by a horizontal rod 16. The depth of opening 17 may be determined by the particular basket design, but being at least of such extent so as to present the lower end thereof in substantial proximity to bottom wall 2 of basket 1 for purposes presently appearing.

Mounted upon the bottom rod 16 of opening 17 at preferably two spaced apart locations thereon are hinge members 18 which are fabricated of sheet material and having loop forming portions 19 being open at their ends for extension substantially upwardly of the received rod 16. Said hinges 18 incorporate at their opposed lower ends cooperating mounting plate portions 20, 20' which embrace the proximate vertical rods 15 and are mutually secured by a screw 21 so as to fix said hinges securely in operative position.

Provided for free extension through said loop portions 19 of hinges 18 is a transverse bottom rod 22 of a gate or closure panel indicated generally 23 for said opening 17 of the related side of basket 1. Said gate 23 is of similar construction to basket 1 being thus comprised of horizontal and vertical rod members 22, 24, respectively, and being co-extensive in height with opening 17 so that when in closed position the same will coordinate with the adjacent portions of basket 1 to present a composite construction. It will thus be seen that the vertical extent of loops 19 of hinges 18 is considerably greater than the diameter of the received transverse rod 22 of gate 23 so that gate 23 may be freely swung thereby within a vertical plane and furthermore that the said gate 23 is accorded a vertical movability, the upper limit of which is determined by abutment of the said transverse rod 22 against the upper portion of hinge loop 19 and with the lower limit being determined by engagement of said rod against the said proximate rod 16 of opening 17. Thus, the swingability, as well as vertical movement of gate 23 are features which are of importance in the present invention.

As may best be seen in FIGURES 1 and 3, keeper members 25 are presented within the said opening 17 at the opposite upper side portions thereof. Each keeper member 25 is formed preferably of sheet metal stock having an upwardly opening hook integrally formed in its lower edge as at 26, which hook portion is rearwardly offset with respect to an integral mounting plate 27 received between the immediately adjacent upper transverse rod 16 of the related side wall and for retaining engagement with a cooperating plate 28 presented on the rearward side of the proximate vertical rods 15 which latter is turned forwardly at its ends for embracing said rods and being secured to said plate 27 by screw 29. As may best be seen in FIGURE 5, the hook-containing portion of keeper 25 is rearwardly off-set with respect to the plane of mounting plate 27 so that the trough of the hook 26 is aligned with the adjacent transverse rod 16. The said hooks 26 are presented for receiving the projecting ends of an upper transverse rod 22' of said gate 23 for maintaining the latter in closed position; it being recognized that in such conditions the said rod 22' will be aligned with the proximate rod 16 of the related side wall.

Thus, in view of the foregoing it will be seen that when in closed position, gate 23 will be received within opening 17 in substantial planar alignment with the proximate side wall and with the particular transverse rod 22' received within hooks 26 of keeper 25, in reliably latched relationship since the weight of said gate 23 will urge transverse rod 22 downwardly in secured position. Accordingly, with gate 23 in closed condition cart A may be used with full confidence that the said gate 23 will not be accidentally opened to cause accidental displacement of cart contents therefrom.

In order to open gate 23, for permitting lateral access to the interior of basket 1, gate 23 is lifted upwardly so as to elevate rod 22' spacedly above hook 26, with consequent elevation of lower rod 22 toward the upper end of loop 19 of hinge 18 and after clearance of rod 22' has been achieved the gate 23 may be then allowed to swing or drop downwardly as for reception upon a receiving surface.

It is evident that gates 23 will be provided within each side wall of cart A or in either one, the location of the same being determined by the normal disposition of cart A adjacent a check-out counter for unloading purposes. It will furthermore be observed that gates 23 with associated hardware may be easily provided within existing cart constructions without costly modification thereof.

Check-out stand B embodies a narrow counter 30 being of a height no greater than the bottom edge of opening 17 so that when cart A is presented adjacent thereto, gate 23 may be received thereon in at least horizontal position or if desired further downwardly swung position. Thus, the attendant unloading cart A may readily reach into basket 1 for easy removal of the merchandise therein; obviating the need for bending to obtain contents from basket 1 and lifting of the same therefrom. Furthermore, counter 30 is sufficiently narrow so that the attendant is put into immediate proximity to basket 1.

Therefore, in view of the foregoing it will be seen that shopping carts constructed in accordance with the present invention provide a means for ready access to the cart interior for simplicity of cart unloading purposes and which means are reliable against undesired displacement during loading.

It will be appreciated that there are numerous expedients for mounting a gate or closure upon cart A for opening 17. However, the means herein illustrated and described have been found to be highly effective, completely reliable in usage, and economical in fabrication. Furthermore, it is apparent that the present invention may be readily manufactured of materials other than rod or wire stock without exceeding the scope of this invention.

It should be understood that changes and modifications in the formation, construction, and arrangement and combination of the several parts of the Shopping Cart may be made and substituted for these herein shown and described without departing from the nature and principle of my invention.

Having described my invention, what I desire to obtain by Letters Patent is:

A system for facile unloading of shopping carts comprising in combination a shopping cart having an article collecting basket, means for supporting said basket in elevated relationship to a support surface, said basket having a pair of upstanding side walls, a front wall, a rearward wall and being open at its top, at least one of said side walls having an opening extending downwardly from its upper edge and terminating upwardly of the said bottom wall, the lower margin of said opening being parallel to the upper and lower edges of said cart, a closure gate for said opening, a pair of loop-forming hinge members mounted upon the lower margin of said side wall opening and normally projecting thereabove, said closure gate having means for free reception within said loop-forming hinge members to allow swingable movement of said closure gate between upward or closed relationship and downwardly or outwardly swung open relationship as well as to permit relative vertical movement of said closure gate to the extent of the height of said loop-forming hinge members, so that said closure gate may be lifted to a point above the lower margin of said opening, a pair of upwardly opening hook-forming members mounted on said side wall of said cart on either side of said opening with the hook portions thereof projecting forwardly from the plane of said wall, elongated members projecting from either side of said closure gate proximate the upper end thereof for disposition within said hook-forming members when said gate is in closed condition, and an article receiving counter presented upon said support surface for presentation adjacent the side of said cart having said opening, said counter having a height substantially co-extensive with the distance between the lower margin of said opening and the support surface so that when said closure gate is in downwardly swung or open position the same will be supportedly received upon said counter in substantial planar parallel relationship to said counter for allowing ready and comfortable access to the cart interior for article and supporting purposes.

References Cited
UNITED STATES PATENTS

| | | |
|---|---|---|
| 2,672,218 | 3/1954 | Genung. |
| 2,943,707 | 7/1960 | Ramlose _____ 186—1 |
| 3,245,498 | 4/1966 | Stanley. |

FOREIGN PATENTS 518,254  11/1955  Canada.

EVON C. BLUNK, *Primary Examiner.*

H. C. HORNSBY, *Assistant Examiner.*